(12) United States Patent
Miller et al.

(10) Patent No.: US 10,951,095 B2
(45) Date of Patent: Mar. 16, 2021

(54) ELECTRIC MACHINE ARC PATH PROTECTION

(71) Applicant: General Electric Company, Schenectady, NY (US)

(72) Inventors: Brandon Wayne Miller, Liberty Township, OH (US); Daniel Alan Niergarth, Norwood, OH (US); Christopher James Kroger, West Chester, OH (US); Christian Xavier Stevenson, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 16/051,982

(22) Filed: Aug. 1, 2018

(65) Prior Publication Data

US 2020/0044518 A1    Feb. 6, 2020

(51) Int. Cl.

| | |
|---|---|
| *F01D 15/10* | (2006.01) |
| *F02C 6/00* | (2006.01) |
| *H02K 11/26* | (2016.01) |
| *B64D 41/00* | (2006.01) |
| *F16C 32/06* | (2006.01) |
| *F16C 41/00* | (2006.01) |
| *H02K 5/167* | (2006.01) |
| *H02K 7/08* | (2006.01) |
| *H02K 7/18* | (2006.01) |

(52) U.S. Cl.
CPC ............ *H02K 11/26* (2016.01); *B64D 41/00* (2013.01); *F01D 15/10* (2013.01); *F16C 32/0603* (2013.01); *F16C 41/004* (2013.01); *H02K 5/1672* (2013.01); *H02K 7/083* (2013.01); *H02K 7/1823* (2013.01); *F05D 2220/50* (2013.01); *F05D 2220/76* (2013.01); *F16C 2380/26* (2013.01); *H02K 2205/03* (2013.01)

(58) Field of Classification Search
CPC ... F16D 1/10; F16D 1/101; F16D 3/02; F16D 2001/103
See application file for complete search history.

(56) References Cited

U.S. PATENT DOCUMENTS

| | | |
|---|---|---|
| 4,208,599 A | 6/1980 | Armor et al. |
| 5,227,950 A | 7/1993 | Twerdochlib |
| (Continued) | | |

FOREIGN PATENT DOCUMENTS

| | | | |
|---|---|---|---|
| EP | 1289099 A2 * | 3/2003 | ............ H02K 7/1823 |
| EP | 1612371 A1 * | 1/2006 | ................ F02C 3/09 |
| (Continued) | | | |

OTHER PUBLICATIONS

Ensinger, VESPEL Material Data Sheet, Oct. 2005 (Year: 2005).*
European Search Report Corresponding to Application No. 19188981 dated Dec. 9, 2019.

*Primary Examiner* — Tulsidas C Patel
*Assistant Examiner* — Thomas K Quigley
(74) *Attorney, Agent, or Firm* — Dority & Manning, P.A.

(57) ABSTRACT

In one an exemplary aspect of the present disclosure, an engine includes a drive shaft; an electric machine including a stator assembly and a rotor assembly, the rotor assembly rotatable relative to the stator assembly; and an electrical break, the drive shaft coupled to the rotor assembly through the electrical break.

19 Claims, 9 Drawing Sheets

(56) References Cited

U.S. PATENT DOCUMENTS

| | | | |
|---|---|---|---|
| 5,385,018 A * | 1/1995 | Kohno | F16D 3/80 |
| | | | 60/338 |
| 5,480,107 A | 1/1996 | Bacon | |
| 6,424,063 B1 | 7/2002 | Whitener et al. | |
| 6,464,230 B1 | 10/2002 | Tong et al. | |
| 6,625,504 B2 | 9/2003 | Landreth | |
| 6,663,526 B2 * | 12/2003 | Janson | F16D 3/80 |
| | | | 192/212 |
| 6,777,822 B1 | 8/2004 | Suttie et al. | |
| 6,881,027 B2 | 4/2005 | Klaas et al. | |
| 7,008,183 B2 | 3/2006 | Sayegh et al. | |
| 7,251,942 B2 | 8/2007 | Dittmar et al. | |
| 7,303,372 B2 | 12/2007 | West et al. | |
| 7,367,193 B1 | 5/2008 | Thompson | |
| 7,489,060 B2 * | 2/2009 | Qu | H02K 19/20 |
| | | | 310/178 |
| 7,707,838 B2 | 5/2010 | Sheldon et al. | |
| 7,725,236 B2 | 5/2010 | Delaloye et al. | |
| 7,748,209 B1 | 7/2010 | Schopf et al. | |
| 8,261,527 B1 | 9/2012 | Stearns et al. | |
| 8,302,403 B2 | 11/2012 | Engle et al. | |
| 8,307,661 B2 | 11/2012 | Harris et al. | |
| 8,310,076 B2 * | 11/2012 | Jones | H02K 7/1823 |
| | | | 290/52 |
| 8,449,255 B2 * | 5/2013 | Tadayon | F03D 80/40 |
| | | | 416/37 |
| 8,622,342 B2 | 1/2014 | Filho | |
| 8,657,227 B1 | 2/2014 | Bayliss et al. | |
| 8,683,814 B2 | 4/2014 | Xu | |
| 8,786,124 B2 * | 7/2014 | Castell Martinez | F03D 15/20 |
| | | | 290/55 |
| 8,927,905 B1 | 1/2015 | Sunday | |
| 8,981,587 B2 * | 3/2015 | Castell Martinez | F03D 15/00 |
| | | | 290/55 |
| 9,024,226 B2 | 5/2015 | Levasseur et al. | |
| 9,267,437 B2 | 2/2016 | Perry et al. | |
| 9,267,438 B2 | 2/2016 | Dooley et al. | |
| 9,303,566 B2 | 4/2016 | Haillot | |
| 9,366,182 B2 | 6/2016 | Rodriguez | |
| 9,404,419 B2 | 8/2016 | Haillot | |
| 9,458,770 B2 | 10/2016 | Anghel et al. | |
| 10,487,839 B2 * | 11/2019 | Kupiszewski | F01D 5/10 |
| 10,550,827 B2 * | 2/2020 | Rogg | F03D 15/00 |
| 2004/0046474 A1 * | 3/2004 | Kalsi | H02K 3/14 |
| | | | 310/179 |
| 2005/0029427 A1 * | 2/2005 | Kingrey | H02K 5/00 |
| | | | 248/638 |
| 2007/0018035 A1 | 1/2007 | Saiz et al. | |
| 2009/0302152 A1 | 12/2009 | Knight | |
| 2011/0229322 A1 * | 9/2011 | Tadayon | F03D 1/065 |
| | | | 416/91 |
| 2013/0013222 A1 | 1/2013 | Gu et al. | |
| 2013/0022468 A1 * | 1/2013 | Castell Martinez | F03D 15/00 |
| | | | 416/170 R |
| 2013/0267375 A1 * | 10/2013 | Tadayon | F03D 1/065 |
| | | | 475/337 |
| 2013/0309079 A1 | 11/2013 | Allen et al. | |
| 2014/0145028 A1 | 5/2014 | Gomez | |
| 2014/0193991 A1 | 7/2014 | York et al. | |
| 2014/0205222 A1 * | 7/2014 | Biggs | F16C 41/002 |
| | | | 384/276 |
| 2015/0089921 A1 | 4/2015 | Rideau et al. | |
| 2015/0096306 A1 | 4/2015 | Sarangapani et al. | |
| 2015/0345396 A1 | 12/2015 | Zelesky et al. | |
| 2016/0153326 A1 | 6/2016 | Muller et al. | |
| 2016/0169026 A1 | 6/2016 | Jones | |
| 2016/0169027 A1 | 6/2016 | Jones | |
| 2016/0229513 A1 | 8/2016 | Scheel et al. | |
| 2016/0251974 A1 | 9/2016 | Slavens et al. | |
| 2018/0051701 A1 * | 2/2018 | Kupiszewski | H02K 5/1732 |
| 2019/0035548 A1 * | 1/2019 | Lubas | H01F 30/06 |
| 2019/0085715 A1 * | 3/2019 | van der Merwe | F02C 7/32 |
| 2020/0044518 A1 * | 2/2020 | Miller | H02K 7/1823 |
| 2020/0052541 A1 * | 2/2020 | Wollenberg | B60L 3/0069 |
| 2020/0141449 A1 * | 5/2020 | Kochsiek | F16D 1/0852 |

FOREIGN PATENT DOCUMENTS

| | | | | |
|---|---|---|---|---|
| FR | 3042174 A1 * | 4/2017 | | H02K 7/1823 |
| WO | WO-2018113865 A1 * | 6/2018 | | H02K 11/00 |

* cited by examiner

ELECTRIC MACHINE ARC PATH PROTECTION

FIELD

The present subject matter relates generally to an arc path protection for an engine having an electric machine.

BACKGROUND

At least one known gas turbine engine includes, in serial flow arrangement, a compressor for compressing air flowing through the engine, a combustor for mixing fuel with the compressed air such that the mixture may be ignited, and a turbine for extracting power from the ignited fuel-air mixture and providing such power to, e.g., the compressor.

In certain configurations, the gas turbine engine including the above turbomachinery may be used to drive an electric generator. For example, the gas turbine engine may be an auxiliary power unit (APU) of an aircraft, the APU including an electric generator for generating electrical power for various systems of the aircraft. Depending on the size of the APU, a relatively high voltage electrical power may be generated. Although the components handling the high voltage electrical power may include insulation to contain such power, over time the insulation may wear down or deteriorate. In such a case, the high voltage electrical power may arc and conduct through the electric generator to the turbomachinery of the APU, causing damage to the turbomachinery of the APU.

Accordingly, one or more features for a gas turbine engine with an electric machine for reducing a risk of electrical power conducting through the engine and damaging the engine would be useful.

BRIEF DESCRIPTION

Aspects and advantages of the invention will be set forth in part in the following description, or may be obvious from the description, or may be learned through practice of the invention.

In one an exemplary aspect of the present disclosure, an engine is provided. The engine includes a drive shaft; an electric machine including a stator assembly and a rotor assembly, the rotor assembly rotatable relative to the stator assembly; and an electrical break, the drive shaft coupled to the rotor assembly through the electrical break.

In certain exemplary embodiments the electrical break is configured to transfer substantially all of a torque between the drive shaft and the rotor assembly of the electric machine.

In certain exemplary embodiments the engine is a turbine engine including a compressor and a turbine, wherein the drive shaft is coupled to at least one of the compressor or the turbine of the turbine engine.

For example, in certain exemplary embodiments the turbine engine is at least one of a turbofan engine, a turboshaft engine, a turbojet engine, or a turboprop engine.

For example, in certain exemplary embodiments the turbine engine is an auxiliary power unit.

For example, in certain exemplary embodiments the turbine engine defines a core air flowpath, and wherein the electric machine is positioned inward of at least a portion of the core air flowpath along a radial direction.

In certain exemplary embodiments the engine is an aeronautical fan engine, wherein the aeronautical fan engine includes a fan having a plurality of fan blades, and wherein the drive shaft is coupled to the plurality of fan blades for driving the plurality of fan blades.

In certain exemplary embodiments the electrical break is formed substantially completely of a non-electrically conductive material.

For example, in certain exemplary embodiments the non-electrically conductive material has an electrical resistivity greater than about $1\times10^{10}$ ρ (Ω·m).

For example, in certain exemplary embodiments the non-electrically conductive material is a plastic material.

In certain exemplary embodiments the electric machine includes a plurality of air bearings, and wherein the rotor assembly and the stator assembly are rotatably coupled using the plurality of air bearings.

For example, in certain exemplary embodiments the rotor assembly and the stator assembly are rotatably coupled completely using the plurality of air bearings during operation of the engine, the plurality of air bearings including at least one radial air bearing and at least one thrust air bearing.

In certain exemplary embodiments the electric machine includes a plurality of mechanical bearings, wherein the rotor assembly and the stator assembly are rotatably coupled using the plurality of mechanical bearings, and wherein each of the plurality of mechanical bearings includes an electrical insulation.

In certain exemplary aspects the method further includes a stationary member, wherein the stator assembly of the electric machine is coupled to the stationary member, and wherein the stationary member includes an electrical isolation section.

In certain exemplary embodiments the engine is configured to generate at least about 250 horsepower during operation, and wherein the drive shaft is configured to transfer at least about 250 pound-feet of torque during operation.

In certain exemplary embodiments the engine is configured to generate at least about 2,000 horsepower during operation, and wherein the drive shaft is configured to transfer at least about 1,500 pound-feet of torque during operation.

In an exemplary aspect of the present disclosure, a method for operating an engine is provided. The method includes rotating a rotor assembly of an electric machine relative to a stator assembly of the electric machine with a drive shaft of the engine by transferring substantially all of a thrust between the rotor assembly and the drive through an electrical break.

In certain exemplary aspects rotating the rotor assembly relative to the stator assembly with the drive shaft by transferring substantially all of the thrust between the rotor assembly and the drive shaft through the electrical break includes driving the rotor assembly with the drive shaft.

In certain exemplary aspects rotating the rotor assembly relative to the stator assembly with the drive shaft by transferring substantially all of the thrust between the rotor assembly and the drive shaft through the electrical break includes driving the drive shaft with the rotor assembly.

In certain exemplary aspects the engine is a turbine engine including a compressor and a turbine defining in part a core air flowpath, wherein the electric machine is positioned at least partially inward of the core air flowpath along a radial direction of the engine, and wherein the drive shaft is coupled to, or otherwise rotatable with, at least one of the compressor or the turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
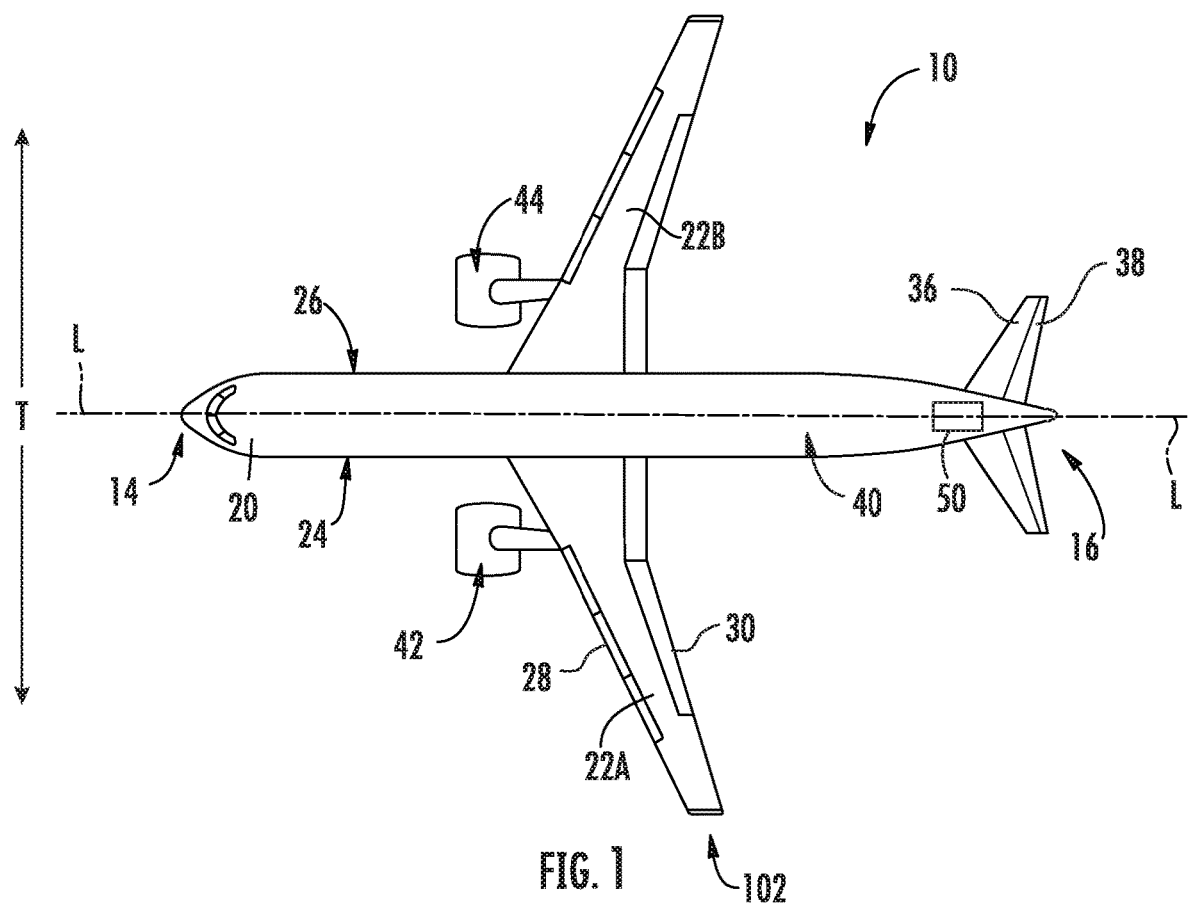
FIG. 1 is a top view of an aircraft in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a component or system, and refer to the normal operational attitude of the component or system. For example, with regard to a gas turbine engine, forward refers to a position closer to an inlet of the gas turbine engine and aft refers to a position closer to an exhaust of the gas turbine engine.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
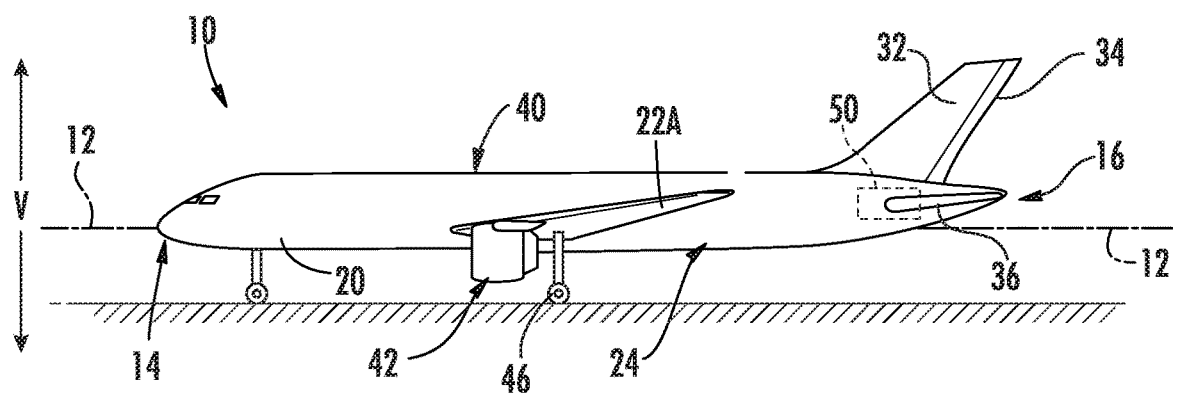
FIG. 2 is a side view of the exemplary aircraft of FIG. 1.

Referring now to the drawings, wherein identical numerals indicate the same elements throughout the Figs., FIG. 1 provides a top view of an exemplary aircraft 10 as may incorporate various embodiments of the present disclosure. FIG. 2 provides a port side 24 view of the aircraft 10 as illustrated in FIG. 1. As shown in FIGS. 1 and 2 collectively, the aircraft 10 defines a longitudinal direction L that extends therethrough, a vertical direction V, a transverse direction T, a forward end 14, and an aft end 16.

Moreover, the aircraft 10 includes a fuselage 20, extending longitudinally from the forward end 14 of the aircraft 10 towards the aft end 16 of the aircraft 10, and a pair of wings 22, or rather, a first wing 22A and a second wing 22B. The first wing 22A extends outwardly from the fuselage 20 generally along the transverse direction T with respect to the longitudinal direction L, from the port side 24 of the fuselage 20. Further, the second wing 22B similarly extends outwardly from the fuselage 20, generally along the transverse direction T with respect to the longitudinal direction L, from a starboard side 26 of the fuselage 20. Each of the wings 22A, 22B for the exemplary embodiment depicted includes one or more leading edge flaps 28 and one or more trailing edge flaps 30.

Referring still to the exemplary aircraft 10 of FIGS. 1 and 2, the aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40. However, it should be appreciated that in other exemplary embodiments of the present disclosure, the aircraft 10 may additionally or alternatively include any other suitable configuration of stabilizers that may or may not extend directly along the vertical direction V or horizontal/transverse direction T. In addition, alternative stabilizers may be any suitable shape, size, configuration, or orientation while remaining within the scope of the present subject matter.

Figure 7:
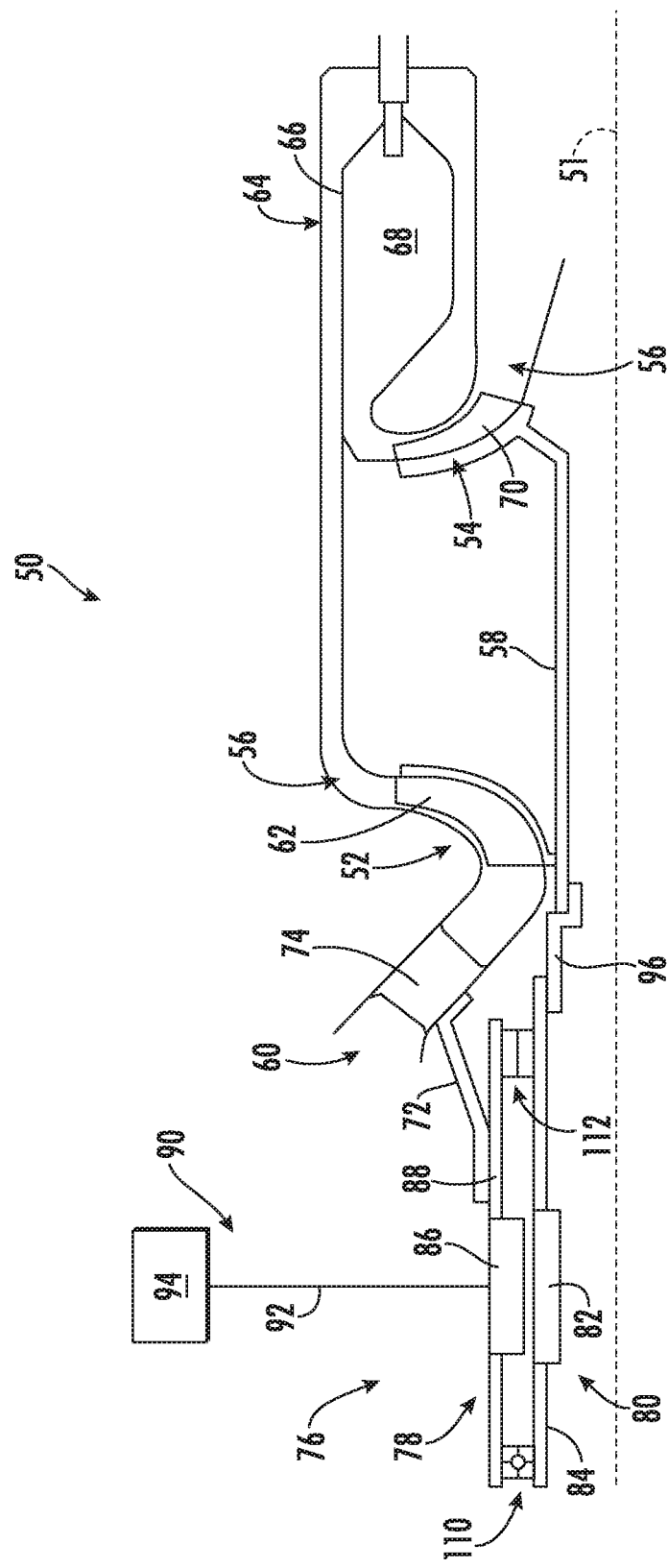
FIG. 7 is a schematic, cross-sectional view of an auxiliary power unit in accordance with another exemplary embodiment of the present disclosure.

The exemplary aircraft 10 of FIGS. 1 and 2 also includes a propulsion system. The exemplary propulsion system depicted includes a plurality of aircraft engines, at least one of which mounted to each of the pair of wings 22A, 22B. Specifically, the plurality of aircraft engines includes a first aircraft engine 42 mounted to the first wing 22A and a second aircraft engine 44 mounted to the second wing 22B. In at least certain exemplary embodiments, the aircraft engines 42, 44 may be configured as turbofan jet engines (see, e.g., FIG. 7) suspended beneath the wings 22A, 22B in an under-wing configuration. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc. Further, in still other exemplary embodiments, the propulsion system may include one or more electric, or hybrid-electric, aircraft engines (e.g., electric fans).

Moreover, it will be appreciated that the exemplary aircraft of FIGS. 1 and 2 includes an auxiliary power unit 50. For the embodiment depicted, the auxiliary power unit 50 is positioned proximate the aft end 16 of the aircraft 10 within the fuselage 20. The auxiliary power unit 50 may be provided for generating electrical power to operate or drive one or more aircraft systems. Additionally, or alternatively, the auxiliary power unit 50 may be configured to generate electrical power to, e.g., start one or more of the aircraft engines 42, 44.

Figure 3:
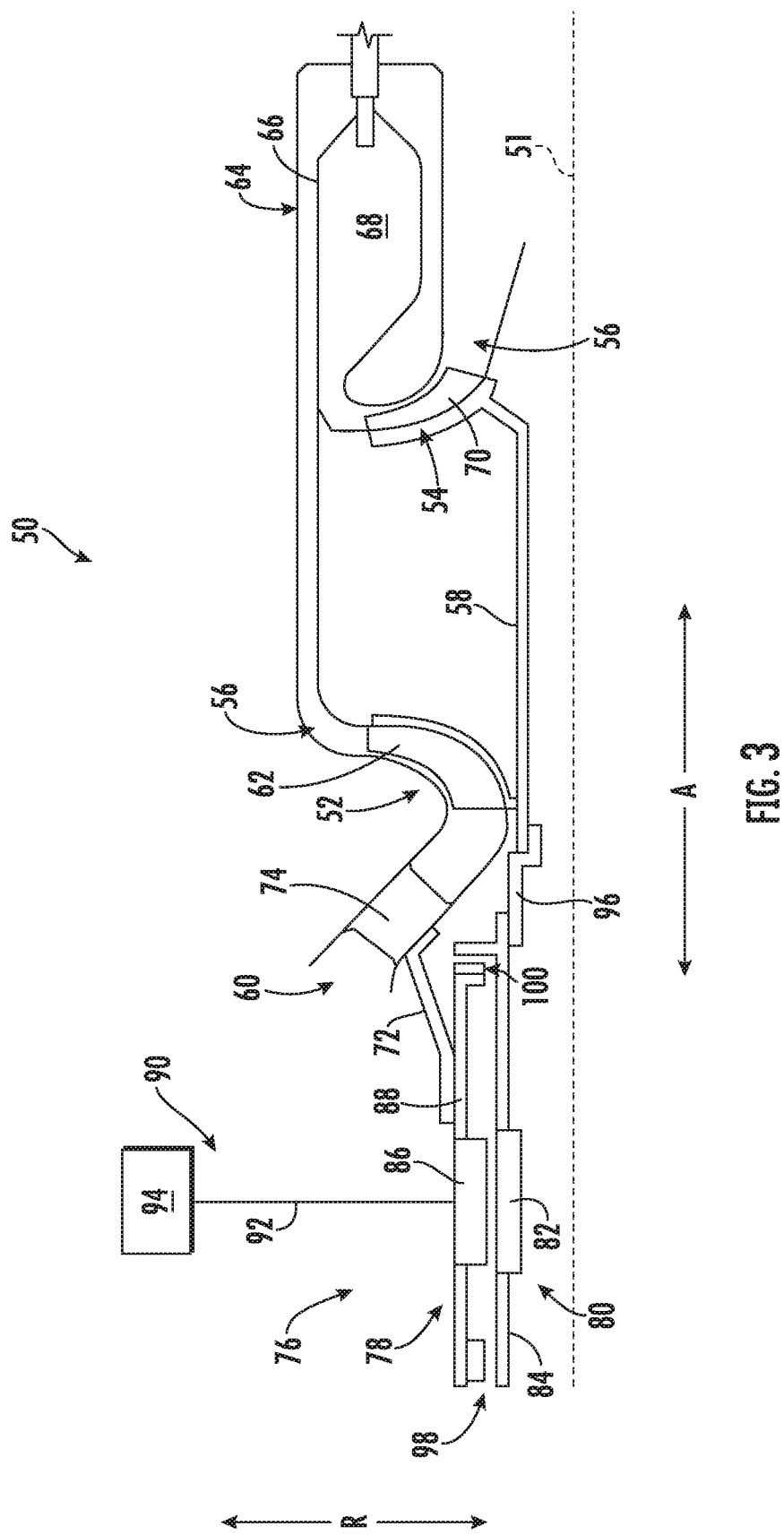
FIG. 3 is a schematic, cross-sectional view of an auxiliary power unit in accordance with an exemplary embodiment of the present disclosure.

Referring now to FIG. 3, a close-up, schematic view of the exemplary auxiliary power unit 50 of FIGS. 1 and 2 is depicted. As will be appreciated, the auxiliary power unit 50 is an engine, and more specifically, is a turbine engine defining an axial direction A, an axis 51 extending along the axial direction A, a radial direction R, and a circumferential direction C (extending about the axis 51; see FIG. 5), and further including a compressor section and a turbine section. More specifically, for the embodiment depicted, the compressor section includes a compressor 52 and the turbine section includes a turbine 54. The compressor 52 and the turbine 54 together define at least in part a core air flowpath 56 of the auxiliary power unit 50. Further, the auxiliary power unit 50 includes a drive shaft 58, the drive shaft 58 coupled to at least one of the compressor 52 or the turbine 54, and more specifically, the drive shaft 58 extends between and couples the compressor 52 and the turbine 54. In such a manner the compressor 52 is rotatable with, and driven by, the turbine 54.

The auxiliary power unit 50 further defines an inlet 60 configured to receive a flow of air, which may be an ambient airflow from outside of the fuselage 20 of the aircraft 10. During operation of the auxiliary power unit 50, air flows from the inlet 60 to the compressor 52, where an impeller 62 of the compressor 52 (coupled to the drive shaft 58) compresses the flow of air. Moreover, the exemplary auxiliary power unit 50 includes a combustion section 64, with the exemplary combustion section 64 depicted including a reverse flow combustor 66. In such a manner, the compressed air from the compressor section flows around the combustor 66 before mixing with fuel and entering a combustion chamber 68 of the combustor 66, where the fuel-air mixture is combusted to generate combustion gases. The combustion gases flow through the turbine 54 of the turbine section, and more specifically, drive an impeller 70 of the turbine 54, rotating the turbine 54. Further, the drive shaft 58 is coupled to the impeller 70 of the turbine 54, such that rotation of the turbine 54 rotates/drives the drive shaft 58.

Additionally, the engine, or rather the auxiliary power unit 50, includes a stationary member and a rotating member. The rotating member is configured to rotate about the centerline axis 51 of the auxiliary power unit 50 during operation of the auxiliary power unit 50 with one or more of the compressor 52 or the turbine 54. By contrast, the stationary member is configured to remain stationary relative to the rotating member during operation of the auxiliary power unit 50. For the embodiment depicted, the rotating member is the drive shaft 58 of the auxiliary power unit 50, and the stationary member is a stationary support member 72. Notably, the stationary support member 72 is fixedly coupled to an inlet strut 74 positioned within the core air flowpath 56 of the auxiliary power unit 50, upstream of the compressor 52 of the compressor section of the auxiliary power unit 50. As will be discussed in greater detail, below, the stationary support member 72 (which may also be described as a stator assembly mount) may provide for electrical isolation of an electric machine 76 (also discussed below). However, in other embodiments, the stationary member may be any other suitable component that remains stationary relative to the rotating member during operation of the auxiliary power unit 50.

Moreover, the exemplary auxiliary power unit 50 further includes an electric machine 76 positioned at a forward end thereof. The exemplary electric machine 76 generally includes a stator assembly 78 and a rotor assembly 80. Further, as is depicted schematically, the rotor assembly 80 generally includes a rotor 82 and a rotor shaft 84. Similarly, the stator assembly 78 generally includes a stator 86 and a stator shaft 88. The electric machine 76 may be configured as any suitable type of electric machine 76, such as an alternating current electric machine, a direct current electric machine, a permanent magnet electric machine, an induction electric machine, a brushed electric machine, etc. Accordingly, it will be appreciated that the stator 86, the rotor 82, or both, may include one or more permanent magnets, electromagnets, coils, etc.

Further, the electric machine 76 depicted is electrically coupled to an electric communication bus 90 through an electric line 92 of the electric communication bus 90. More specifically, the stator 86 of the electric machine 76 is electrically coupled to the electric line 92 of the electric communication bus 90. The electric communication bus may electrically connect the electric machine 76 to a power circuit of an aircraft, of a propulsion system, etc. The electric communication bus 90 further includes, for the embodiment depicted, a controller 94. The controller 94 may generally include power electronics, sensors, computers, processors, etc. In such a manner, the controller 94 may condition and/or direct the electrical power provided to the electric machine 76, the electrical power extracted from the electric machine 76, or both.

Moreover, the rotor assembly 80 is rotatable relative to the stator assembly 78 during operation of the auxiliary power unit 50. More specifically, the stator assembly 78 is coupled to the stationary member of the auxiliary power unit 50, and the rotor assembly 80 is coupled to, or otherwise rotatable with, the rotary component of the auxiliary power unit 50, which for the embodiment depicted is the drive shaft 58. Accordingly, when operated as an electric generator, the rotor assembly 80 of the electric machine 76 may be driven by the drive shaft 58 of the auxiliary power unit 50 to generate electrical power, also referred to as extracting power from the auxiliary power unit 50. By contrast, when operated as an electric motor, the rotor assembly 80 of the electric machine 76 may drive the drive shaft 58 of the auxiliary power unit 50 to, e.g., start the auxiliary power unit 50.

Regardless of the operating mode, the stator assembly 78 of the electric machine 76 may generate or receive electrical power having a relatively high-voltage, high levels of current, or both. In the event that, e.g., an insulation within the stator 86 of the stator assembly 78 breaks down or is otherwise insufficient to contain the electrical power, it may be possible for the electricity generated or received by the stator assembly 78 to connect to one or more electrically conductive components of the electric machine 76 through an electrical arc. In such a case, the electrical power may be conducted through, e.g., the rotor assembly 80 and to the drive shaft 58 of the auxiliary power unit 50. Once conducted to the drive shaft 58 of the auxiliary power unit 50, such electricity may flow through one or more relatively sensitive components, causing damage to such components (such as one or more bearings, sensors, etc.).

Accordingly, for the embodiment depicted, the auxiliary power unit 50 further includes an electrical break 96, with the drive shaft 58 being coupled to the rotor assembly 80 through the electrical break 96. Specifically, for the embodiment depicted, the rotor assembly 80 is coupled to the drive shaft 58 of the auxiliary power unit 50 solely through the electrical break 96, such that the electrical break 96 is configured to transfer substantially all of a torque between the drive shaft 58 in the rotor assembly 80 of the electric machine 76. For example, when operated as an electric motor, substantially all of the torque generated by the electric machine 76 is transferred from the rotor shaft 84 of the rotor assembly 80 of the electric machine 76 to the drive shaft 58 through the electrical break 96. Similarly, when operated as an electric generator, substantially all of the torque generated by the auxiliary power unit 50 (that is to be transferred to the electric machine 76) is transferred from the drive shaft 58 through the electrical break 96 to the rotor shaft 84 of the rotor assembly 80 of the electric machine 76.

In order to prevent electricity from being conducted from the rotor assembly 80 of the electric machine 76 to the drive shaft 58 of the auxiliary power unit 50, the electrical break 96 is formed substantially completely of a non-electrically conductive material. For example, in certain exemplary aspects, the non-electrically conductive material may be a plastic material, such as one or more of a polyethylene, polypropylene, polyvinyl chloride, acrylonitrile butadiene styrene, phenolics or phenol formaldehyde, polyetheretherketone, polyimide, etc. In such a manner, it will be appreciated that in at least certain exemplary embodiments, the non-electrically conductive material may have an electrical resistivity greater than about $1\times10^{10}$ ρ (Ω·m) and up to about $1\times10^{26}$ ρ (Ω·m). For example, the non-electrically conductive material may have an electrical resistivity greater than about $1\times10^{12}$ ρ (Ω·m), such as greater than about $1\times10^{14}$ ρ (Ω·m), such as greater than about $1\times10^{16}$ ρ (Ω·m).

Moreover, as will be appreciated from FIG. 3, the exemplary electrical break 96 depicted is essentially a shaft extending between the electric machine 76, and more particularly the rotor shaft 84, and the drive shaft 58. Further, the electrical break 96 defines a minimum gap distance between the rotor shaft 84 and the drive shaft 58 (i.e., a minimum distance between the two components). For the embodiment shown, the minimum gap distance is at least about 0.25 inches, such as at least about 0.5 inches, such as at least about 0.75 inches, such as at least about 1.5 inches, such as at least about three (3) inches. The minimum gap distance is only limited at its upper end by the distance between the electric machine 76 and the components of the engine being driven by the drive shaft 58 (which may be around one (1) foot and up to around ten (10) feet). Such a minimum gap distance between the rotor shaft 84 and the drive shaft 58 may further ensure a low likelihood of any electrical arcing between the components, despite the high electrical resistance of the electrical break 96.

By including the electrical break 96 in accordance with one or more these exemplary embodiments, the auxiliary power unit 50 may ensure, with a reasonable degree of certainty, that electricity generated by, or transferred to, the stator assembly 78 of the electric machine 76 (and conducted to the rotor assembly 80 through, e.g., an electrical arc) is not conducted from the rotor assembly 80 to the drive shaft 58 of the auxiliary power unit 50, potentially damaging certain components thereof.

Further, as noted above, in certain exemplary embodiments, the stationary support member 72 may also be configured to provide for electrical isolation of the electric machine 76, and more specifically of the stator assembly 78. For example, the stationary support member 72 may be formed of a material similar to the electrical break 96 for the rotor assembly 80, such as a suitable plastic material or other non-conductive material. Additionally, or alternatively, the support member 72 may include a portion or section with suitable structure for electrically isolating the stator assembly 78 relative to the auxiliary power unit 50. For example, in certain embodiments, the stationary support member 72 may include one or more of the structures described below with reference to FIGS. 4 through 6. In such a manner, the stator assembly 78 may be electrically isolated from the engine/auxiliary power unit 50. Alternatively, however, any other suitable structure may be utilized.

Moreover, as is also noted above, it will be appreciated that the rotor assembly 80 is configured to rotate relative to the stator assembly 78 and more specifically, that the rotor assembly 80 and stator assembly 78 are rotatably coupled. For the embodiment depicted, the electric machine 76 includes a plurality of air bearings. More specifically, for the embodiment depicted, the rotor assembly 80 and the stator assembly 78 are rotatably coupled completely using the plurality of air bearings during operation of the auxiliary power unit 50. The plurality of air bearings, for the embodiment shown, includes at least one radial air bearing 98 and at least one thrust air bearing 100. For the embodiment shown, the radial air bearing 98 is positioned at a forward end of the electric machine 76, forward of the rotor 82 and stator 86, and the thrust air bearing 100 is positioned at an aft end of the electric machine 76, aft of the rotor 82 and stator 86. In certain exemplary embodiments, the plurality of air bearings, i.e., the radial air bearing 98 and the thrust air bearing 100 for the embodiment shown, may receive compressed air from, e.g., the compressor 52 of the compressor section of the auxiliary power unit 50. However, in other embodiments, the air bearings may receive compressed air flow from any other suitable high pressure air source.

It will be appreciated that rotatably coupling the rotor assembly 80 to the stator assembly 78 through the plurality of air bearings may further reduce the likelihood that the electricity generated by, or provided to, the stator assembly 78 of the electric machine 76 is transferred to the rotor assembly 80 during operation of the auxiliary power unit 50 and electric machine 76. More specifically, by utilizing air bearings, the rotor shaft 84 may not be in physical contact with the stator shaft 88 during operation, creating a layer of insulation (i.e., air) between the two components.

It will be appreciated, however, that in other exemplary embodiments, any other suitable configuration may be provided for the electrical break 96, the engine (i.e., the auxiliary power unit 50 for the embodiment above), and/or the electric machine 76. For example, referring now briefly to FIGS. 4 through 6, three alternative embodiments are provided of an electrical break 96 in accordance with the present disclosure. The electrical breaks 96 depicted may be configured in substantially the same manner as the electrical break 96 described above. For example, the electrical break 96 may couple a drive shaft 58 of an engine to a rotor assembly 80 of an electric machine 76 of the engine, or more specifically to a rotor shaft 84 of the rotor assembly 80.

Figure 4:
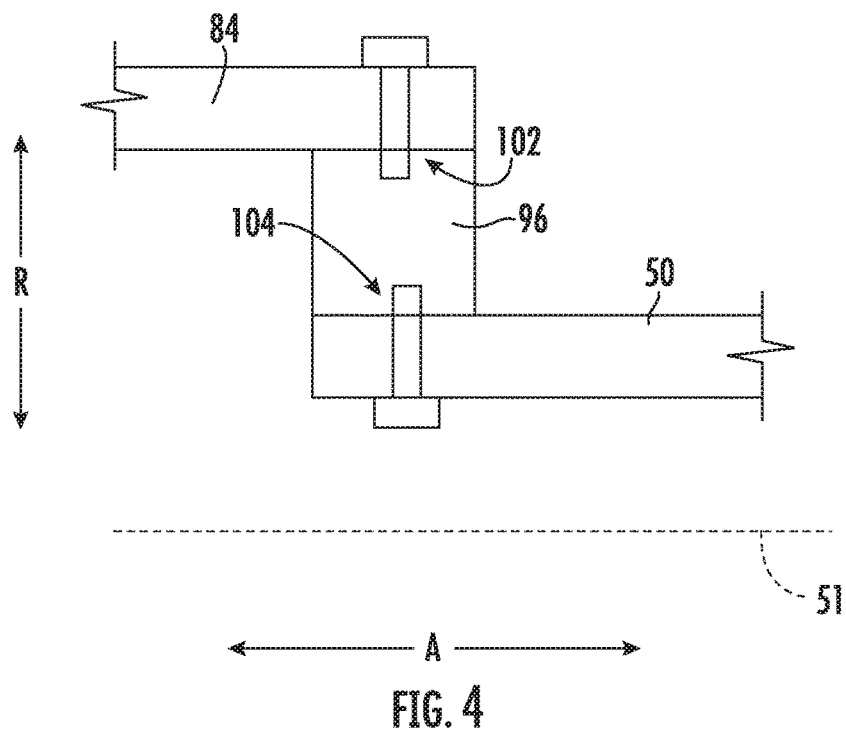
FIG. 4 is a close-up view of an electrical break in accordance with an embodiment of the present disclosure.
Figure 5:
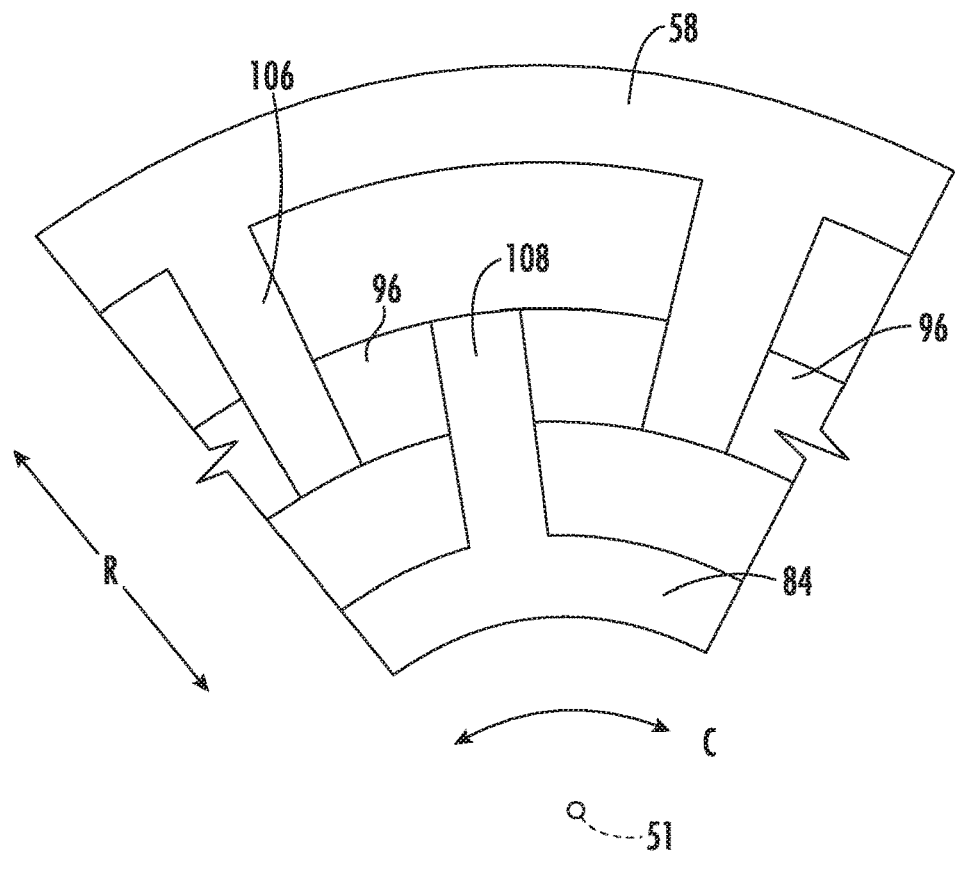
FIG. 5 is a close-up view of an electrical break in accordance with another embodiment of the present disclosure.
Figure 6:
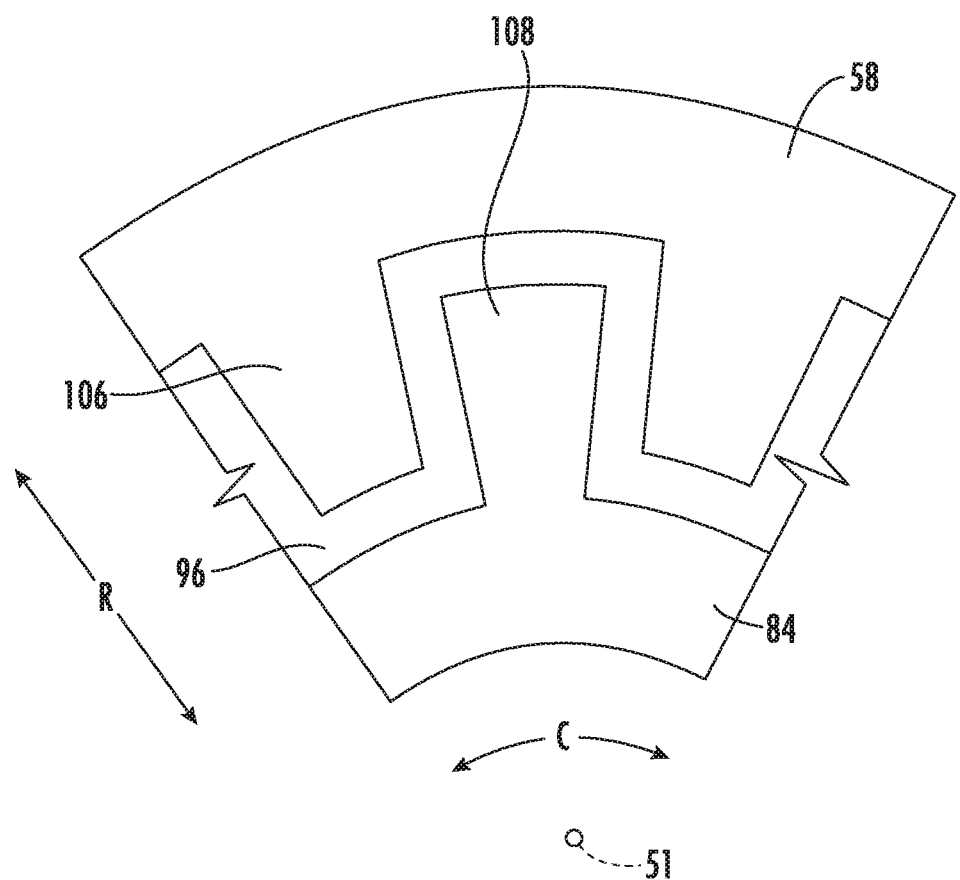
FIG. 6 is a close-up view of an electrical break in accordance with yet another embodiment of the present disclosure.

The exemplary embodiments of FIGS. 4 through 6 may reduce an amount of mechanical stress on the electrical break 96, such that the electrical break 96 may be formed of a material without the material strength properties of a traditional shaft. For example, referring first particularly to FIG. 4, the rotor shaft 84 and drive shaft 58 overlap along an axial direction A of the engine, and the electrical break 96 extends between the rotor shaft 84 and drive shaft 58 along a radial direction R of the engine. Notably the electrical break 96 is coupled to the rotor shaft 84 at a first attachment point 102 and to the drive shaft 58 at a second attachment point 104. The first attachment point 102 and second attachment point 104 are substantially aligned along the axial direction A.

By contrast, for the embodiment of FIG. 5, the drive shaft 58 again overlaps with the rotor shaft 84 along the axial direction A, and for the embodiment depicted, the rotor shaft 84 is nested within the drive shaft 58. More specifically, the drive shaft 58 includes a plurality of inwardly extending teeth 106 spaced along a circumferential direction C of the engine and the rotor shaft 84 similarly includes a plurality of outwardly extending teeth 108 spaced along the circumferential direction C of the engine. The electrical break 96 is positioned circumferentially between the teeth 106, 108 to electrically insulate the two shafts 58, 84. In such a manner, it will be appreciated that the electrical break 96 is configured as an insert positioned between a rotor shaft spline of the rotor shaft 84 and a drive shaft spline of the drive shaft 58. Notably, in other embodiments, the rotor shaft 84 and drive shaft 58 may be switched.

Similarly, FIG. 6 may be configured in a similar manner to FIG. 5. For example, the drive shaft 58 again overlaps with the rotor shaft 84 along the axial direction A, and for the embodiment depicted, the rotor shaft 84 is nested within the drive shaft 58. Additionally, the drive shaft 58 includes a plurality of inwardly extending teeth 106 spaced along a circumferential direction C of the engine and the rotor shaft 84 similarly includes a plurality of outwardly extending teeth 108 spaced along the circumferential direction C of the engine. The electrical break 96 is positioned circumferentially between the teeth 106, 108 to electrically insulate the two shafts 58, 84. More specifically, the electrical break 96 is configured as an insulating coating to provide the desired electrical insulation.

Further, it will be appreciated that in each of these embodiments, the drive shaft 58 and rotor shaft 84 define a minimum gap distance designed to reduce a likelihood of an electrical arc forming therebetween. Further, still, in other embodiments, any other suitably configured electrical break 96 may be provided.

Moreover, as noted above, in still other exemplary embodiments, any other suitable configuration may be provided for the engine (i.e., the auxiliary power unit 50 for the embodiment above) and electric machine 76. For example, referring now briefly to FIG. 7, an auxiliary power unit 50 in accordance with another exemplary embodiment of the present disclosure is provided. For the embodiment depicted, the auxiliary power unit 50 is configured in substantially the same manner as the exemplary auxiliary power unit 50 described above with reference to FIG. 3. Accordingly, the same or similar numbers may refer to the same or similar part.

For example, as is depicted, the exemplary auxiliary power unit 50 includes a drive shaft 58 rotatable with a compressor 52 of a compressor section and a turbine 54 of a turbine section. Additionally, the auxiliary power unit 50 includes the electric machine 76, with the electric machine 76 including a rotor assembly 80 rotatable relative to a stator assembly 78. The rotor assembly 80 generally includes a rotor 82 and a rotor shaft 84, and similarly, the stator assembly 78 generally includes a stator 86 and a stator shaft 88.

The rotor assembly 80 and stator assembly 78 are rotatably coupled using a plurality of bearings. However, for the embodiment depicted, the plurality bearings are not configured as air bearings, and instead are configured as mechanical bearings. More specifically, the plurality of bearings includes a first mechanical bearing 110 positioned proximate a forward end of the electric machine 76 and a second mechanical bearing 112 positioned proximate an aft end of the electric machine 76. For the embodiment shown, the first mechanical bearing 110 is configured as a ball bearing and the second mechanical bearing 112 is configured as a roller bearing.

Figure 8:
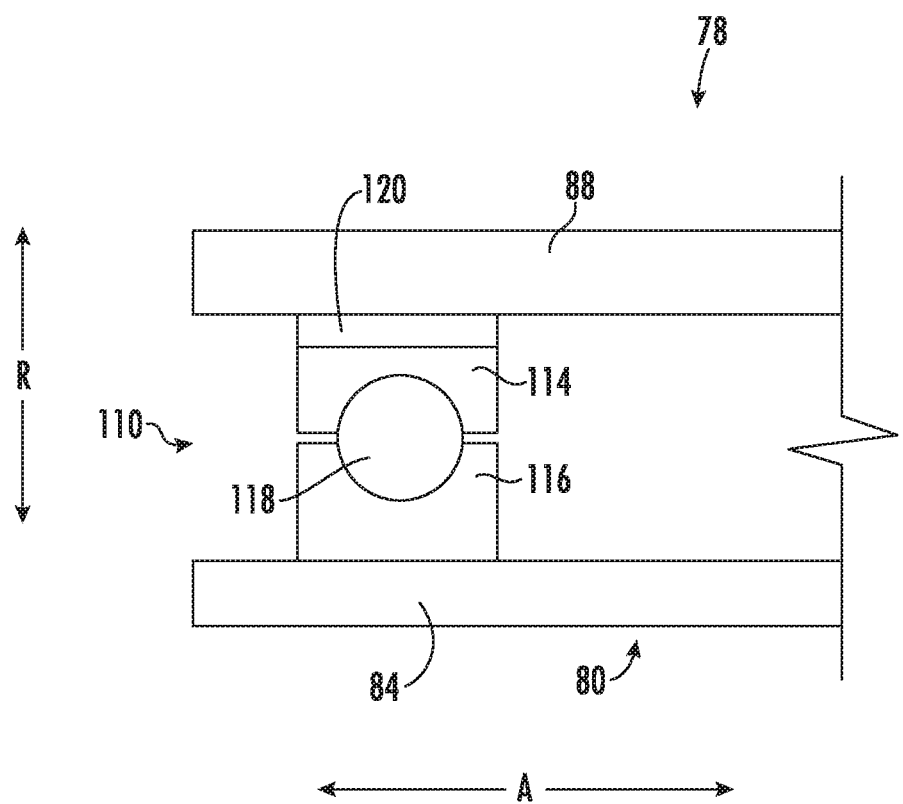
FIG. 8 is a close up view of a bearing of an electric machine of the exemplary auxiliary power unit of FIG. 7.

Referring briefly also to FIG. 8, providing a close-up, cross-sectional, schematic view of the first mechanical bearing 110, it will be appreciated that the first mechanical bearing 110 generally includes an outer race 114, an inner race 116, and a plurality of balls 118 positioned therebetween. Additionally, for the embodiment shown, the first mechanical bearing 110 includes an electrical insulation layer 120 positioned between the outer race 114 and the stator shaft 88. The electrical insulation layer 120 may be any suitable electrical insulator material, such as a material having an electrical resistance the same as that discussed above with respect to the electrical break 96. The electrical insulation layer may therefore electrically insulate the first mechanical bearing 110, preventing (or at least reducing a likelihood of) a conduction of electricity from the stator assembly 78 to the rotor assembly 80 through the first mechanical bearing 110. It will similarly be appreciated that, although not depicted, the second mechanical bearing 112 may similarly include an electrical insulation layer positioned between an outer race and the stator shaft 88. Notably, by positioning the electrical insulation layer between the outer race 114 and the stator shaft 88, the bearing 110 itself (i.e., the outer race 114, rollers or balls 118, inner race 116, etc.) may be insulated from conducting electricity, which may cause damage to the bearing 110.

It will be appreciated, however, that in other exemplary embodiments, any other suitable configuration may be provided for electrically insulating a rotatable connection between the stator assembly 78 and the rotor assembly 80. For example, instead of, or in addition to, including electrical insulation layer 120, the bearing rolling elements, the inner race, and/or the outer race themselves may be the electrical insulation layer. For example, in certain exemplary embodiments, the mechanical bearings may include a ceramic roller element, such as ceramic balls 118 (for the ball bearing 110 configuration of FIG. 8), or ceramic rollers for a roller bearing (e.g., roller bearing 112). The ceramic roller elements may be formed of any suitable material to provide a desired electrical insulation (e.g., within the ranges discussed for the electrical break 96), such as a silicon nitride ceramic material.

Further, as noted above, it will be appreciated that in other exemplary embodiments, the engine may have any other suitable configuration. For example, in other exemplary embodiments, the engine may be any other suitable turbine engine, such as a gas turbine engine, such as any one of a turbofan engine, a turboshaft engine, a turbojet engine, or a turboprop engine. Specifically, for example, referring now to FIG. 9, a schematic, cross-sectional view of an engine in accordance with another exemplary embodiment of the present disclosure is provided. For the embodiment depicted, the engine is configured as a high bypass turbofan engine 200. Notably, in at least certain embodiments, the aircraft engines 42, 44 of FIGS. 1 and 2 may be configured in substantially the same manner as exemplary turbofan engine 200 depicted in FIG. 9, discussed below.

Figure 9:
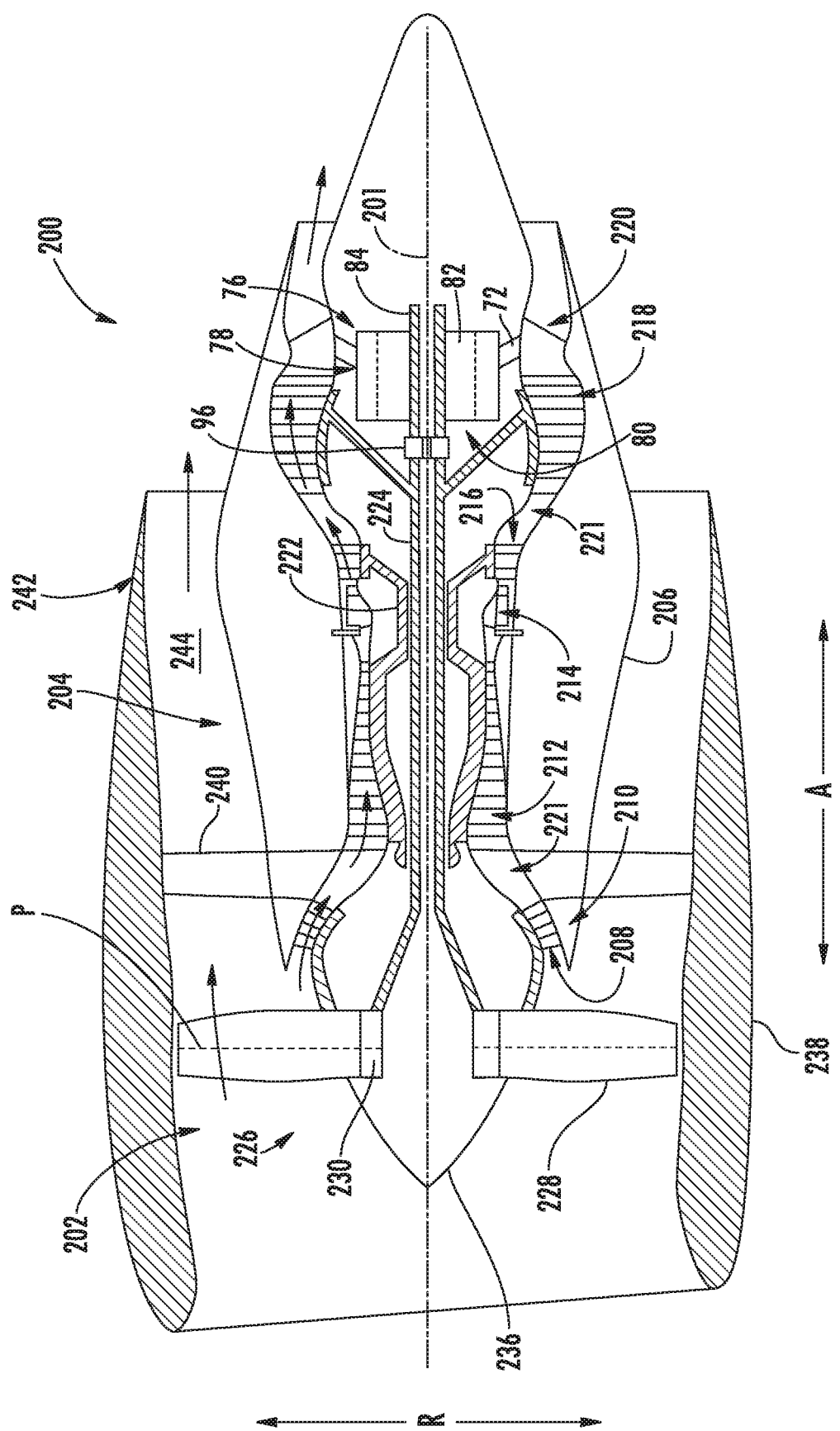
FIG. 9 is a schematic, cross-sectional view of a gas turbine engine in accordance with an exemplary embodiment of the present disclosure.

As shown in FIG. 9, the turbofan 200 defines an axial direction A (extending parallel to a longitudinal centerline 201 provided for reference), a radial direction R, and a circumferential direction (extending about the axial direction A; not depicted in FIG. 9). In general, the turbofan 200 includes a fan section 202 and a turbomachine 204 disposed downstream from the fan section 202.

The exemplary turbomachine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define at least in part a core air flowpath 221 extending from the annular inlet 208 to the jet nozzle exhaust section 220. The turbofan engine further includes one or more drive shafts. More specifically, the turbofan engine includes a high pressure (HP) shaft or spool 222 drivingly connecting the HP turbine 216 to the HP compressor 212, and a low pressure (LP) shaft or spool 224 drivingly connecting the LP turbine 218 to the LP compressor 210.

For the embodiment depicted, the fan section 202 includes a fan 226 having a plurality of fan blades 228 coupled to a disk 230 in a spaced apart manner. The fan blades 228 and disk 230 are together rotatable about the longitudinal axis 201 by the LP shaft 224. The disk 230 is covered by rotatable front hub 236 aerodynamically contoured to promote an airflow through the plurality of fan blades 228.

Additionally, the exemplary turbofan engine 200 includes an annular fan casing or outer nacelle 238 that circumferentially surrounds the fan 226 and/or at least a portion of the turbomachine 204. The nacelle 238 is supported relative to the turbomachine 204 by a plurality of circumferentially-spaced outlet guide vanes 240. A downstream section 242 of the nacelle 238 extends over an outer portion of the turbomachine 204 so as to define a bypass airflow passage 244 therebetween.

Moreover, referring still to FIG. 9, the exemplary turbofan 200 depicted includes an electric machine 76 rotatable with the fan 226. Specifically, for the embodiment depicted, the electric machine 76 is positioned within, or aft of, the turbine section of the turbofan engine 200, and at least partially inward of the core air flowpath 221 along the radial direction R. Moreover, the exemplary electric machine 76 depicted is co-axially mounted to and rotatable with the LP shaft 224 (the LP shaft 224 also rotating the fan 226). As used herein, "co-axially" refers to the axes being aligned. It should be appreciated, however, that in other embodiments, an axis of the electric machine 76 may be offset radially from the axis 201 of the LP shaft 224 and further may be oblique to the axis 201 of the LP shaft 224, such that the electric machine 76 may be positioned at any suitable location at least partially inward of the core air flowpath 221. Further, in other embodiments, the electric machine 76 may be positioned at any other suitable location. For example, in other embodiments, the electric machine 76 may be mounted within, e.g., the compressor section, radially outward of the core air flowpath 221 and within the outer casing 206, etc.

The electric machine 76 generally includes a rotor assembly 80 and a stator assembly 78. In certain exemplary embodiments, the rotor assembly 80 and stator assembly 78 of the electric machine 76 may be configured in substantially the same manner as the exemplary rotor assembly 80 and stator assembly 78 of the electric machine 76 described above with reference to FIGS. 1 through 3. For example, as is depicted schematically, the rotor assembly 80 generally includes a rotor 82 and a rotor shaft 84. Further, the turbofan engine 200 depicted includes an electrical break 96. The drive shaft, or rather, the LP shaft 224, is coupled to the rotor assembly 80 through the electrical break 96. As with the embodiments above, the electrical break 96 is configured to transfer substantially all of a torque between the LP shaft 224 and the rotor assembly 80 of the electric machine 76. In such a manner, it will be appreciated that inclusion of the electrical break 96 to couple the drive shaft 58 to the rotor assembly 80 may assist with ensuring electricity generated by, or provided to, the electric machine 76 of the turbofan engine 200 is not undesirably conducted through the rotor assembly 80 and to, e.g., the LP shaft 224 to relatively sensitive components of the turbofan engine 200.

Further, the exemplary turbofan engine 200 additionally includes a stationary member 72, with the stator assembly 78 coupled to the stationary member 72. The stationary member 72 may be configured in a similar manner as the stationary member 72 discussed above, and thus may include an electrical isolation section to further electrically isolate the electric machine 76 from the turbomachine 204. Additionally, the stationary member 72 may be coupled to any suitable stationary structure of the engine 200, such as a strut or frame, such as a rear strut or rear frame for the embodiment shown.

Notably, from the discussion herein, it will be appreciated that in at least certain embodiments the engine including an electric machine in accordance with one or more of the embodiments described herein may be a relatively powerful engine. For example, the engine may be configured to generate at least about 250 horsepower (hp), such as at least about 500 hp, such as at least about 1000 hp, such as at least about 2000 hp, such as at least about 10,000 hp, such as at least about 20,000 hp, such as up to about 150,000 hp. In such a manner, it will be appreciated that a driveshaft (e.g., driveshaft 58 of FIG. 3 or LP shaft 224 of FIG. 9) of the engine may be configured to transfer a relatively large amount of torque during operation of the engine (such as during peak operating conditions), such as at least about 250 pound-feet of torque. For example, the driveshaft may be configured to transfer at least about 450 pound-feet of torque, or at least about 750 pound-feet of torque. Or in other embodiments, the driveshaft may be configured to transfer at least about 1,500 pound-feet of torque, such as at least about 5,000 pound-feet of torque, 10,000 pound-feet of torque, or 50,000 pound-feet of torque, and up to about 150,000 pound-feet of torque.

Further, in still other exemplary embodiments, the engine including the electric machine 76 and electrical break 96 may have still other suitable configurations. For example, referring now briefly to FIG. 10, a schematic, cross-sectional view of an engine in accordance with yet another exemplary embodiment of the present disclosure is provided. For the embodiment depicted, the engine is configured as an aeronautical fan engine 250. More specifically, for the embodiment of FIG. 10, the engine is configured as an electric-powered aeronautical fan engine 250. In such a manner, it will be appreciated that the aeronautical fan engine 250 generally includes a fan 252 having a plurality of fan blades 254, a drive shaft 58 coupled to the plurality of fan blades 254 for driving the plurality of fan blades 254, and the electric machine 76. The electric machine 76 of FIG. 10 may be configured in substantially the same manner as one or more of the exemplary electric machines 76 described above with reference to FIGS. 1 through 9. For example, the electric machine 76 of FIG. 10 generally includes a rotor assembly 80 and a stator assembly 78. The drive shaft 58 of the electric aeronautical fan engine 250 is coupled to the rotor assembly 80 of the electric machine 76 through an electrical break 96, such that the electrical break 96 is configured to transfer substantially all of a torque between the drive shaft 58 and the rotor assembly 80 of the electric machine 76.

Figure 10:
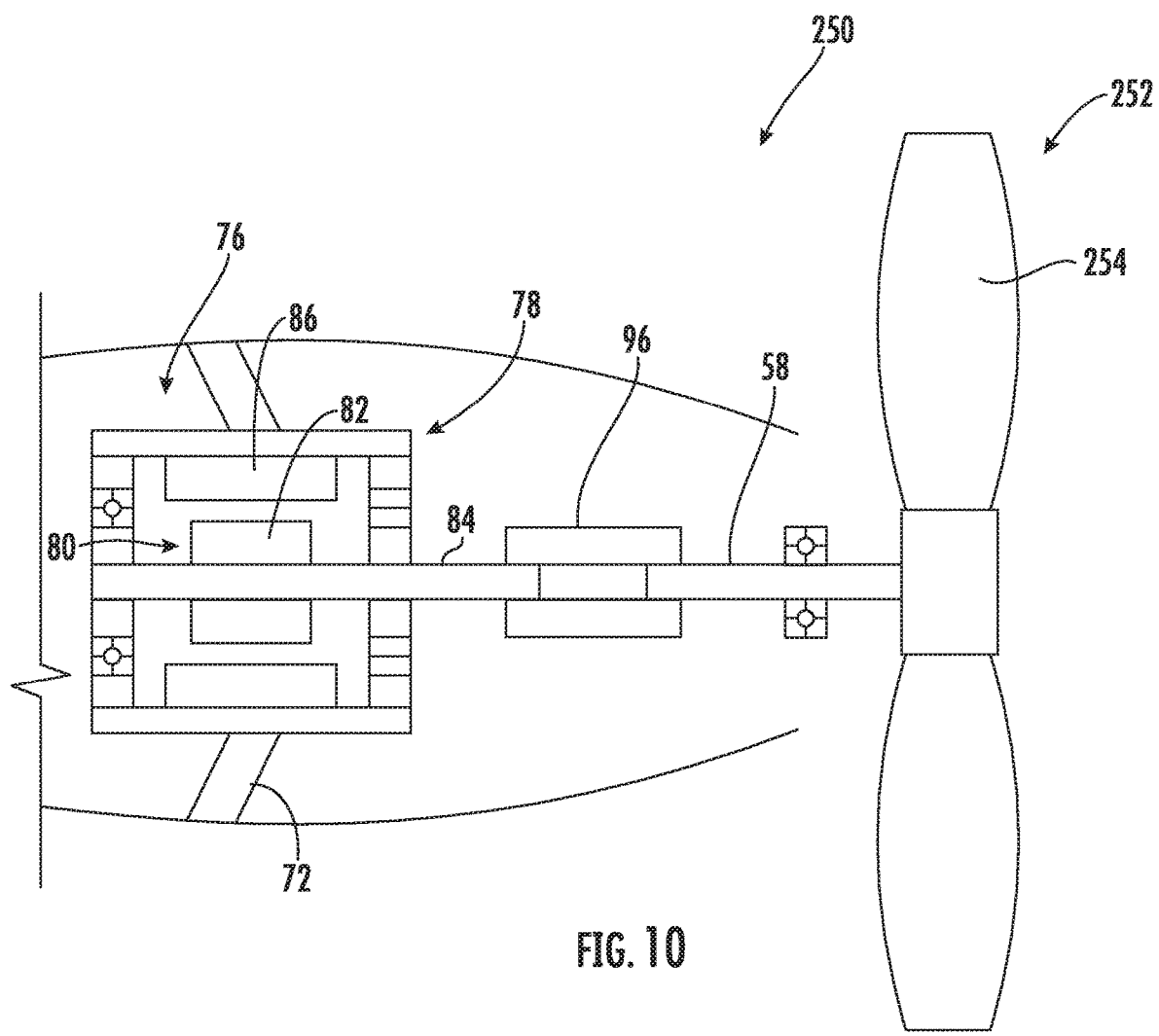
FIG. 10 is a schematic, cross-sectional view of an aeronautical fan engine in accordance with an exemplary embodiment of the present disclosure.

Notably, the exemplary electric aeronautical fan engine 250 of FIG. 10 may be incorporated into, e.g., the exemplary propulsion system of the aircraft of FIGS. 1 and 2. With such an exemplary embodiment, the aeronautical fan engine 250 may be mounted, e.g., to one or more of the wings 22, at the aft end 16 of the aircraft 10, etc. In such a manner, the electric aeronautical fan engine 250 may be configured to receive electrical power generated by, e.g., a separate electric machine driven by one or more of the gas turbine engines of the propulsion system, such as in the embodiment of FIG. 9.

Further, it will be appreciated that in still other exemplary embodiments of the present disclosure, any other suitable type of engine may be utilized with the present disclosure. For example, in addition to the embodiments described above, the present disclosure may be utilized with any suitable electric machine and turbine combination, a ram air turbine utilizing an electric machine, etc.

Figure 11:
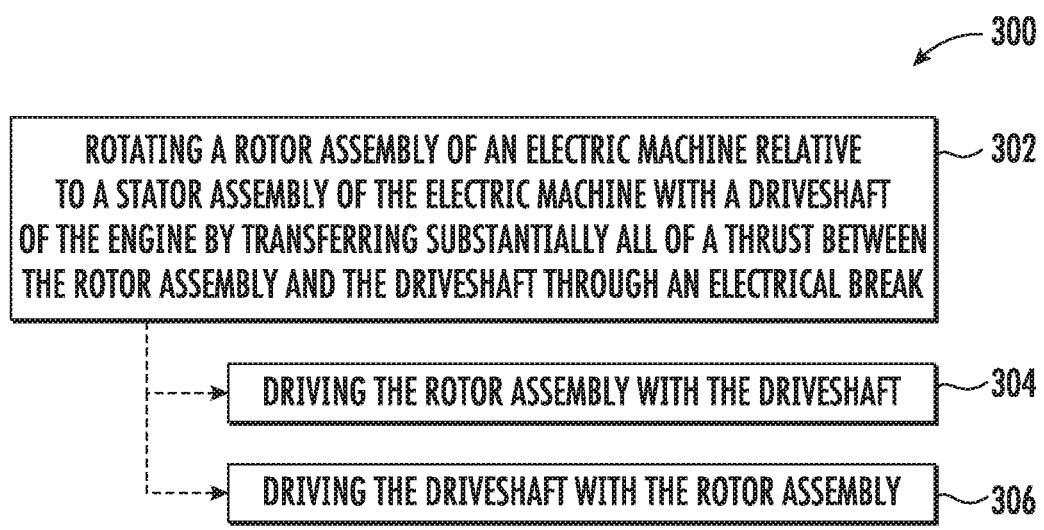
FIG. 11 is a flow diagram of a method for operating an engine in accordance with an aspect of the present disclosure.

Referring now to FIG. 11, a method 300 for operating an engine in accordance with an exemplary aspect of the present disclosure is provided. The exemplary method 300 may be utilized with one or more of the exemplary engines and electric machines described above with reference to FIGS. 1 through 9. For example, in certain exemplary aspects, the engine may be a turbine engine having a compressor and a turbine defining in part a core air flowpath. Further, in certain exemplary aspects, the electric machine may be positioned at least partially inward of the core air flowpath along a radial direction of the engine and the driveshaft may be coupled to, or otherwise rotatable with, at least one of the compressor of the turbine. For example, the engine may be an auxiliary power unit, a turbofan engine, a turboshaft engine, a turboprop engine, a turbojet engine, etc. Notably, however, in one or more these embodiments, the electric machine may not be positioned inward of the core air flowpath, and instead may be located any other suitable location. In still other exemplary aspects, the engine may be an aeronautical fan engine, not including turbomachinery.

As is depicted, the exemplary method 300 generally includes at (302) rotating a rotor assembly of an electric machine relative to a stator assembly of the electric machine with a driveshaft of the engine by transferring substantially all of a thrust between the rotor assembly and the driveshaft through an electrical break. Notably, the electrical break of the exemplary method 300 may be configured in the same manner as one or more the exemplary electrical breaks described above.

It will be appreciated that in certain exemplary aspects, the electric machine may be operated as an electric generator. Accordingly, with such an exemplary aspect, rotating the rotor assembly relative to the stator assembly with the driveshaft by transferring substantially all of the thrust between the rotor assembly and the drive shaft through the electrical break at (302) may include at (304) driving the rotor assembly with the driveshaft. By contrast, in other exemplary aspects, the electric machine may be operated as an electric motor. Accordingly, with such an exemplary aspect, rotating the rotor assembly relative to the stator assembly with the driveshaft by transferring substantially all of the thrust between the rotor assembly and the drive shaft through the electrical break at (302) may include at (306) driving the driveshaft with the rotor assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine defining an axial direction, the engine comprising:
   a drive shaft;
   an electric machine comprising a stator assembly and a rotor assembly, the rotor assembly rotatable relative to the stator assembly, the rotor assembly comprising a rotor shaft; and
   an electrical break, the drive shaft coupled to the rotor shaft of the rotor assembly through the electrical break, wherein the drive shaft and the rotor shaft overlap along the axial direction, and wherein electrical break is positioned at least partially between the drive shaft and the rotor shaft.

2. The engine of claim 1, wherein the electrical break is configured to transfer substantially all of a torque between the drive shaft and the rotor assembly of the electric machine.

3. The engine of claim 1, wherein the engine is a turbine engine comprising a compressor and a turbine, wherein the drive shaft is coupled to at least one of the compressor or the turbine of the turbine engine.

4. The engine of claim 3, wherein the turbine engine is at least one of a turbofan engine, a turboshaft engine, a turbojet engine, or a turboprop engine.

5. The engine of claim 3, wherein the turbine engine is an auxiliary power unit.

6. The engine of claim 3, wherein the turbine engine defines a core air flowpath, and wherein the electric machine is positioned inward of at least a portion of the core air flowpath along a radial direction.

7. The engine of claim 1, wherein the engine is an aeronautical fan engine, wherein the aeronautical fan engine comprises a fan having a plurality of fan blades, and wherein the drive shaft is coupled to the plurality of fan blades for driving the plurality of fan blades.

8. The engine of claim 1, wherein the electrical break is formed substantially completely of a non-electrically conductive material having an electrical resistivity greater than about $1\times10^{10}$ ρ (Ω·m).

9. The engine of claim 8, wherein the non-electrically conductive material is a plastic material.

10. The engine of claim 1, wherein the electric machine comprises a plurality of air bearings, and wherein the rotor assembly and the stator assembly are rotatably coupled using the plurality of air bearings.

11. The engine of claim 10, wherein the rotor assembly and the stator assembly are rotatably coupled completely using the plurality of air bearings during operation of the engine, the plurality of air bearings including at least one radial air bearing and at least one thrust air bearing.

12. The engine of claim 1, wherein the electric machine comprises a plurality of mechanical bearings, wherein the rotor assembly and the stator assembly are rotatably coupled using the plurality of mechanical bearings, and wherein each of the plurality of mechanical bearings comprise an electrical insulation.

13. The engine of claim 1, further comprising:
a stationary member, wherein the stator assembly of the electric machine is coupled to the stationary member, and wherein the stationary member comprises an electrical isolation section.

14. The engine of claim 1, wherein the engine is configured to generate at least about 250 horsepower during operation, and wherein the drive shaft is configured to transfer at least about 250 pound-feet of torque during operation.

15. The engine of claim 1, wherein the engine is configured to generate at least about 2,000 horsepower during operation, and wherein the drive shaft is configured to transfer at least about 1,500 pound-feet of torque during operation.

16. A method for operating an engine defining an axial direction, the method comprising:
rotating a rotor assembly of an electric machine relative to a stator assembly of the electric machine with a drive shaft of the engine by transferring substantially all of a thrust between the rotor assembly and the drive through an electrical break;
wherein the drive shaft is coupled to a rotor shaft of the rotor assembly through the electrical break, wherein the drive shaft and the rotor shaft overlap along the axial direction, and wherein electrical break is positioned at least partially between the drive shaft and the rotor shaft.

17. The method of claim 16, wherein rotating the rotor assembly relative to the stator assembly with the drive shaft by transferring substantially all of the thrust between the rotor assembly and the drive shaft through the electrical break comprises driving the rotor assembly with the drive shaft.

18. The engine of claim 1, wherein the rotor shaft includes teeth extending along a radial direction of the engine, wherein the driveshaft includes teeth extending along a radial direction of the engine, and wherein the electrical break is positioned at least partially between the teeth of the driveshaft and the teeth of the rotor shaft along a circumferential direction of the engine.

19. The engine of claim 1, wherein the electrical break extends between the rotor shaft and the driveshaft along a radial direction of the engine.

* * * * *